(12) United States Patent
Wilkes

(10) Patent No.: US 8,341,076 B1
(45) Date of Patent: Dec. 25, 2012

(54) AUTOMATIC OVERDRAFT ATTACHED TO PREPAID DEBIT CARD ACCOUNTS

(75) Inventor: T. Clay Wilkes, North Salt Lake, UT (US)

(73) Assignee: Galileo Processing, Inc., Salt Lake City, UT (US)

( * ) Notice: Subject to any disclaimer, the term of this patent is extended or adjusted under 35 U.S.C. 154(b) by 1232 days.

(21) Appl. No.: 11/137,992

(22) Filed: May 25, 2005

Related U.S. Application Data

(60) Provisional application No. 60/574,021, filed on May 25, 2004.

(51) Int. Cl.
*G06Q 40/00* (2006.01)
(52) U.S. Cl. ............... 705/39; 705/35; 705/38; 705/40; 705/42
(58) Field of Classification Search ............ 705/35–45; 364/406; 235/379, 380, 381
See application file for complete search history.

(56) References Cited

U.S. PATENT DOCUMENTS

| | | | |
|---|---|---|---|
| 5,025,138 A | | 6/1991 | Cuervo |
| 5,557,516 A | * | 9/1996 | Hogan ........................... 705/41 |
| 5,991,747 A | * | 11/1999 | Tomoyuki et al. ............. 705/41 |
| 6,764,001 B1 | * | 7/2004 | Kawai et al. .................. 235/380 |
| 2002/0022966 A1 | * | 2/2002 | Horgan ............................. 705/1 |
| 2003/0036998 A1 | * | 2/2003 | Alliston ........................... 705/40 |
| 2004/0006536 A1 | * | 1/2004 | Kawashima et al. ........... 705/39 |
| 2004/0225604 A1 | * | 11/2004 | Foss et al. ....................... 705/39 |

FOREIGN PATENT DOCUMENTS

| | | |
|---|---|---|
| EP | 01396805 | 3/2004 |
| WO | WO 9618162 | 6/1996 |
| WO | WO 0030046 | 5/2000 |

OTHER PUBLICATIONS

"Debit cards don't offer credit card protections", The Record, Bergen County, N.J.: Feb. 17, 2004, p. L. 10. (ProQuest web).*
"Arbuthnot Latham to launch private banking service", *Private Banker International*, No. 102, Feb. 1997, pp. 4, © 1997 Lafferty Publications Ltd.
"B of A Taps Small-Business market With Credit Card", *Bank Technology News*, vol. 8 No. 6, Jun. 1995, pp. 7, © 1995 Faulkner & Gray Inc.
"Meridian Product Features Debit Cards for Employees", *American Banker*, vol. clix, No. 243, Dec. 20, 1994, pp. 9.

* cited by examiner

*Primary Examiner* — Hai Tran
(74) *Attorney, Agent, or Firm* — Maschoff Gilmore & Israelsen

(57) ABSTRACT

A system for managing financial accounts includes one or more account holders. An account holder data structure is associated with one or more financial accounts. The financial accounts are defined to flexibly respond to the needs of the account holders. A balance is also associated with each of the one or more financial accounts, and an overdraft balance is associated with at least one of the one or more financial accounts. The balances, including the overdraft balance, are accessed through the accounts by one or more access methods, such as prepaid debit card or stored value financial cards. When a transaction initiated with an access method attempts to access an amount in a balance which exceeds the available amount of the balance, the access method accesses an amount in the overdraft balance through the overdraft account to complete the transaction.

20 Claims, 3 Drawing Sheets

AUTOMATIC OVERDRAFT ATTACHED TO PREPAID DEBIT CARD ACCOUNTS

CROSS-REFERENCE TO RELATED APPLICATIONS

This application claims the benefit of U.S. Provisional Patent Application Ser. No. 60/574,021, filed May 25, 2004, entitled "Automatic Overdraft Attached to Prepaid Debit Card Accounts," which is incorporated herein by reference.

BACKGROUND OF THE INVENTION

1. The Field of the Invention

The present invention relates to overdraft coverage for financial accounts. More particularly, embodiments of the present invention relate to an overdraft line of credit that is linked to a stored value or prepaid debit card such that transactions that exceed the available funds in such cards can be completed.

2. Related Technology

In the financial account industry, various types of financial accounts permit account holders to initiate payment in a commercial transaction. An example of such an account is a personal checking account in which account holders can issue personal checks that result in funds being drawn from the checking account and transferred to the recipient of the check. In the absence of some sort of mechanism for covering transactions that would exceed the available funds in the checking account, checks that purport to transfer an amount of money that exceeds such available funds bounce, or are rejected.

In order to eliminate or decrease the number of bounced or rejected checks written by account holders, most financial institutions that offer checking accounts also offer overdraft protection in the form of a line of credit that is linked to the checking accounts. When a financial transaction draws funds from a checking account in excess of the available funds, the difference is covered by money from the line of credit. The overdraft protection in a checking account is tied to a proprietary system for check clearing. In recent years, debit cards have been tied to personal checking accounts, such that overdraft lines of credit have been available through checking debit cards.

More recently, stored value or prepaid debit cards have been introduced by a number of financial institutions. In general, such prepaid debit cards are not linked to a specific account in a bank or another financial institution that is tied directly to a single card holder. Specifically, prepaid debit cards are not linked to individual checking accounts or other individual bank accounts. Instead, an issuer typically pools funds that are obtained from a large number of holders of prepaid debit cards as the card holders load the cards with money. These funds are pooled in a single bank account while the processor maintains the necessary accounting system for allocating specific amounts of the pooled account balance to individual card holders. However, for various reasons, including the lack of any underlying bank accounts dedicated to individual card holders, overdraft protection has not been available for prepaid debit cards.

In addition, merchants who accept, for example, Visa or MasterCard branded cards are able to accept Visa or MasterCard branded prepaid debit cards for transactions under certain limits without verifying that sufficient funds are available. These limits vary from country to country. For example, in the United States, merchants can accept branded debit cards for transactions of less than $50.00 without verifying that the card is loaded with at least the amount of the transaction. Other countries have significantly higher limits.

This fact that merchants do not need to verify that sufficient funds are available, combined with the general unavailability of conventional overdraft protection for prepaid debit cards, has exposed issuers and processors of such cards to the potential of being unable to recover overdrawn funds from card holders.

SUMMARY OF THE INVENTION

These and other problems relating to recovering overdrawn funds from a cardholder are overcome by embodiments of the present invention in which a stored value or prepaid debit card is linked with an overdraft account or credit account that provides overdraft protection when the cardholder exceeds the primary balance associated with the stored value or prepaid debit card. When the primary balance available to the stored value card is insufficient to cover a transaction, the necessary funds are obtained from the overdraft line or credit.

These and other aspects of the present invention will become more fully apparent from the following description and appended claims, or may be learned by the practice of the invention as set forth hereinafter.

BRIEF DESCRIPTION OF THE DRAWINGS

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The drawings are not drawn to scale. The invention will be described and explained with additional specificity and detail through the use of the accompanying drawings in which.

DETAILED DESCRIPTION OF THE INVENTION

The present invention relates to overdraft protection linked to a prepaid debit or stored value financial card. According to the present invention, an overdraft account is incorporated in systems and methods for managing accounts for customers of a financial institution wherein the accounts are defined in a way that allows a single balance in an account to be associated with or used by more than one account holder, to be accessed by more than one card or access method, or to be associated with more than one account type. The data that defines the accounts using the techniques disclosed herein are stored in a database or other data structure and allow the financial institution to control and manage the account activity in ways that are compatible with the account definition.

The accounts created and managed according to the principles disclosed herein are highly flexible and can be adapted to the needs of individual account holders and financial institutions. In contrast, conventional accounts are significantly more rigid and cannot be readily adapted to the needs of numerous account holders or financial institutions.

Although the accounts and systems for managing the accounts can have any number of uses and applications, several specific, non-limiting examples are disclosed herein. For example, a given financial institution can use these techniques to allow a client to access a balance in more than one way. In this example, the client may open an account and obtain a stored value financial card and load the card with funds, such as from a payroll payment or any other funding method, such as those available at retail locations. In this situation, the card typically is an impersonal card (i.e., the name of the client is not printed on the card), in which case, the card may not be branded by Visa or MasterCard. However, the client may also want to access the same balance by using a branded Visa or MasterCard debit card. The techniques for defining and managing accounts disclosed herein enable this type of account structure to be implemented. It is emphasized that this is but one of substantially unlimited ways in which a particular account can be defined and used. Further, the account access methods are not limited to financial cards, but extend to any other technique for accessing a balance, such as virtual accounts, online access, bill payment, and so forth.

Figure 1:
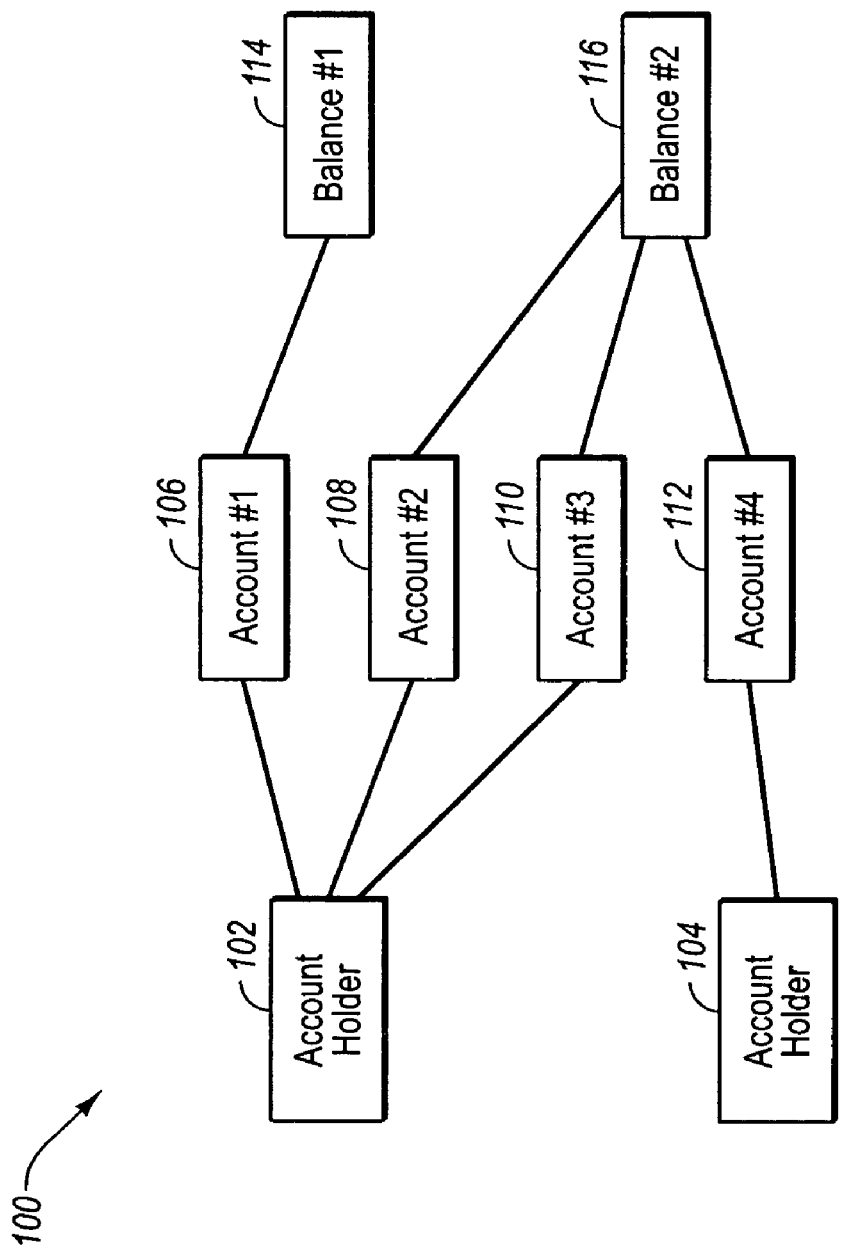
FIG. 1 is a block diagram of an exemplary system for managing accounts.

With attention now to FIG. 1, a system 100 for managing accounts is shown. A client or individual is associated with system 100 using an account holder data structure 102, with account holder data structure 102 defining information about the client or individual. For example, the account holder data structure 102 may contain information such as the name, address, telephone number, social security number, and/or other information about the client designated as account holder data structure 102. The account holder data structure may also include passwords and login information associated with the corresponding user. System 100 may include any number of account holders data structures in addition to account holder data structure 102. For example, system 100 includes account holder data structure 104 as well as account holder data structure 102. The account holder data structures are also referred to herein as "account holders" and "cardholders."

Within system 100 each account holder 102 and 104 is associated with one or more accounts, also referred to as controls. Each control may have one or more associated funding methods, such as direct deposit, retail loads, home equity lines of credit, or value in a brokerage account. Account holder 102 is linked to accounts 106, 108, and 110 and account holder 104 is linked to account 112. Each account 106, 108, 110, and 112 has a set of characteristics which define the account. Examples of characteristics of each of accounts 106, 108, 110, and 112 include the fees associated with the account, and the capabilities of the account, such as how value, or an amount, can be transferred to and from the account and the ways in which the account holder is able to access the account. Further, the number of accounts within a given system is not limited and can increase or decrease according to the needs and preferences of the given account holder(s). Accounts 106, 108, 110, and 112, in addition to ways of accessing each of accounts 106, 108, 110, and 112, are discussed in further detail with reference to FIG. 2 below.

As shown in FIG. 1, account 106 is associated with balance 114, and accounts 108, 110, and 112 are associated with balance 116. Each of accounts 106, 108, 110, and 112 can be associated with only one balance 114 or 116. There can also be multiple balances, such as a savings, prepaid, or credit balance, such as overdraft or line of credit providing heretofore unavailable hybrid accounts. As shown with balance 116 and accounts 108, 110, and 112, a single balance may be associated with more than one account. Balances 114 and 116 represent value, or an amount, linked to accounts 106, 108, 110, and 112. The value or amount stored in each of balances 114 and 116 may be dollars, a line of credit, points, minutes, or any other stored value. The value stored in balances 114 and 116 is accessed through accounts 106, and 108, 110, and 112, respectively, as is shown in further detail with reference to FIG. 2 below.

As illustrated in FIG. 1, the general account system 100 and the model for defining the accounts and the capabilities thereof provide a significant degree of flexibility not available in prior art financial account systems. For instance, a single account holder (e.g., 102) can be linked to multiple account controls (e.g., 108 and 110). A single balance (e.g., 116) can be linked to and accessed from multiple account controls (e.g., 108, 110 and 112), including account controls associated with different account holders. The one-to-one or many-to-one options when defining the relationships between 1) account holders and account controls and 2) account controls and balances gives a significant amount of flexibility when defining how the users associated with the accounts can access the accounts and the associated balances, as well as the characteristics of the accounts that are made available to the individual users. Examples of some of the numerous beneficial ways in which these accounts can be used are described in greater detail below in reference to FIG. 3.

Figure 2:
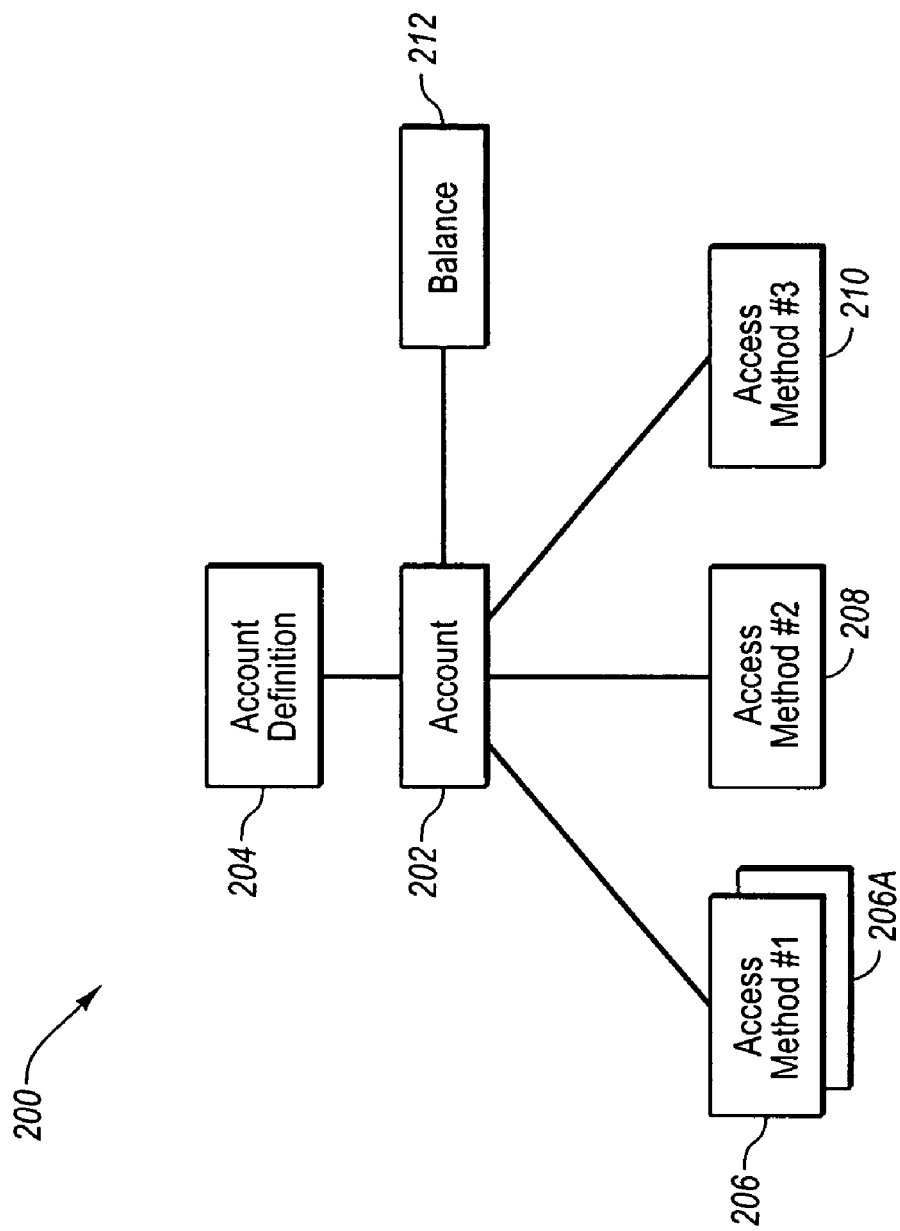
FIG. 2 is a block diagram of an exemplary account.

With attention now to FIG. 2, a system 200 for managing an account 202 is shown. Account 202 is associated with one or more account holders (not shown), as discussed above with reference to FIG. 1. The capabilities and functionality of account 202 are defined by account definition 204. For example, account definition 204 may define functionality for account 202 whereby account 202 may interact with other accounts (not shown). In addition, account definition 204 may define functionality allowing funds to be transferred from other accounts (not shown) to account 202. Further, account definition 204 defines the capabilities of account 202 to interface with any number of access methods.

According to account definition 204, account 202 may be associated with any number of access methods, such as access methods 206, 208, and 210. In addition, although account 202 may initially be associated with access methods 206, 208, and 210, account definition 204 may be configured to allow account 202 to be associated with additional access methods as needed. Access methods 206, 208, and 210 allow a client or individual to access the stored value of balance 212 through account 202 and also include ways for value to be added to balance 212 through account 202. Further, access methods 206, 208, and 210 represent any number of ways to access the stored value of balance 212 through account 202. For example, possible access methods 206, 208, and 210 include a single MC/VISA branded debit card, a single Cirrus/Maestro debit ATM card, a single PLUS or STAR debit ATM card, a single ATM balance residing at a financial institution, a single MC/VISA branded credit card, a prepaid value card, a phone card, email access to a virtual account, any electronic device providing similar account access, or any number and combination of the above listed access methods. The access method can also be bill payment transactions, card-to-card transfers, or sending the value to another financial institution.

In addition, other possible access methods 206, 208, and 210 which may add value to balance 212 associated with account 202 include providing payroll funds, providing funds from a Health Savings Account ("HSA"), providing funds through a credit account linked to home equity, and any other method or combination of methods for accessing account 202 in order to add funds to balance 212. Indeed, a given account 202 may include any number of access methods and may further include the capability of adding or removing access methods according to the needs or preferences of the particular account holder(s).

Although account 202 may have multiple access methods 206, 208, and 210 associated with account 202, each of access methods 206, 208, and 210 is associated with only one account, account 202. Embodiments of the present invention provide increased flexibility and ease in maintaining account holder access to balance 212, through account 202, by one or more of access methods 206, 208, and 210. For example, in exemplary system 200 access method 206 may comprise a debit card. In the event the debit card is lost or stolen, embodiments of the present invention provide an efficient way to deal with the lost or stolen card. For instance, the lost or stolen debit card access method 206 may be designated as inactive, to prevent someone other than the account holder from accessing balance 212. Debit card access method 206 can then be replaced with a new debit card, designated as debit card access method 206A. Thus, embodiments of the present invention provide and efficient way for dealing with lost or stolen access methods by easily inactivating an access method and replacing the inactivated access method with a new access method linked to the account and balance of the original access method.

Debit card access method 206 is one exemplary implementation of a means for accessing a balance 212 through an account 202. However, any other method or methods of comparable functionality can be employed as well. By way of example, some embodiments of the present invention include credit cards, prepaid cards, virtual accounts, bill payment or check writing as access methods.

An example of a financial system as discussed above is included in U.S. Provisional Patent Application Ser. No. 60/574,319, filed May 25, 2004, entitled "Financial Account Systems with Multiple Users and Access Methods," and in U.S. patent application Ser. No. 11/137,993, filed May 25, 2005, entitled "Financial Account Systems with Multiple Users and Access Methods." The foregoing patent applications are incorporated herein by reference.

Figure 3:
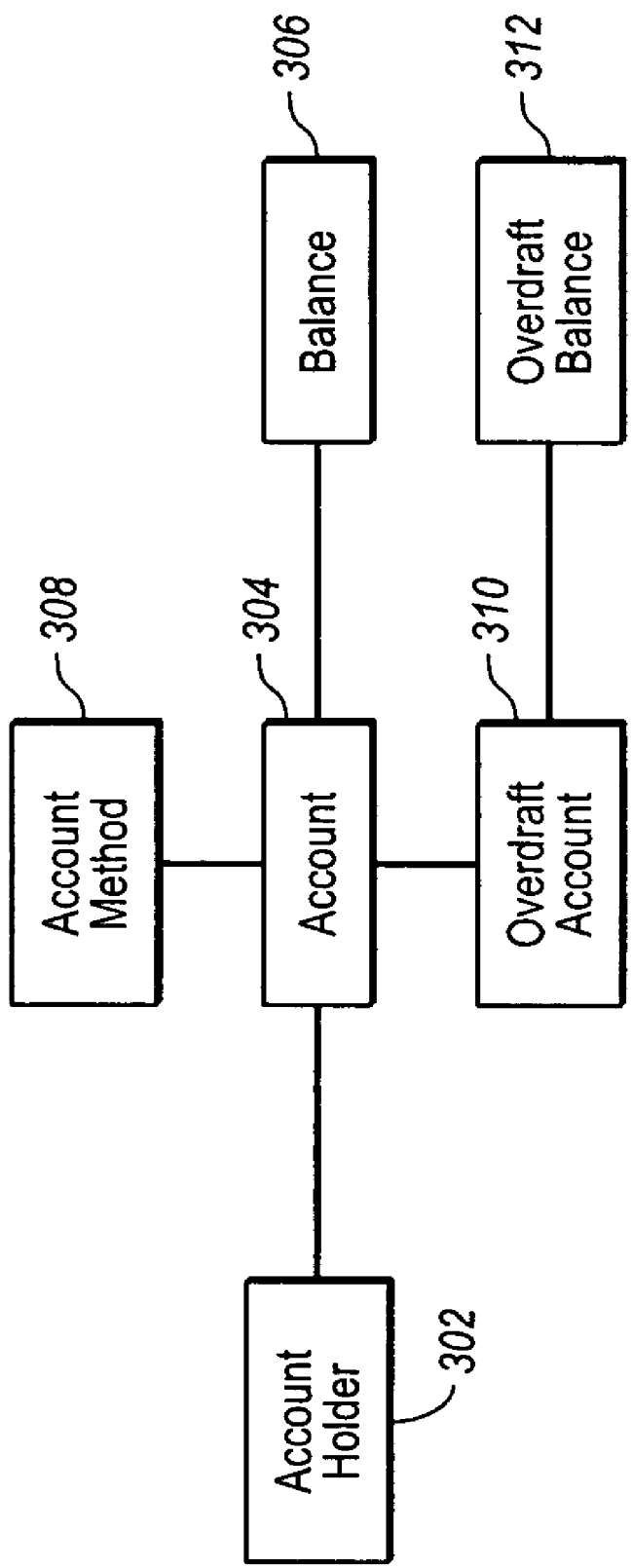
FIG. 3 is a block diagram of an exemplary overdraft account system.

With attention now to FIG. 3, a system 300 for linking an account to an overdraft account or line of credit is shown. An account holder 302, associated with a user as discussed above with reference to FIG. 1, has an account 304 associated with a primary balance 306. Access method 308, such as a prepaid financial card, accesses an amount associated with balance 306 through account 304. Prepaid financial cards include financial cards, such as a debit or credit card, where funds associated with the financial cards are prepaid by the user and then accessed through the financial card during a financial transaction with a merchant.

In addition, account 304 is associated with an overdraft account 310 and an associated balance 312. Overdraft account 310, also referred to as an overdraft account control, may be any type of overdraft account, including, for example, a line of credit account. An issuer or processor of access method 308, for example, determines at the time the account holder establishes account 304 with access method 308 that a line of credit of a certain amount will be granted to the account holder. Although the line of credit may be of any amount, in one embodiment of the invention the amount is at least as great as the limit under which merchants are not required to verify that sufficient funds are available to the account holder 302 prior to completing a transaction initiated with access method 308.

It is noted that, in one embodiment of the invention, accounts 304 and 310 are not bank accounts, but are instead accounts associated with a prepaid financial card. Conventional prepaid financial cards have not been associated with bank accounts. Moreover, those who use prepaid financial cards typically do not have a banking relationship and have not been able or have been unwilling to obtain a bank account. Because conventional overdraft protection has been offered by banks, those who use prepaid financial cards have not had overdraft protection because 1) the prepaid financial cards are not offered by banks that have been the conventional sources of overdraft protection and 2) most prepaid financial card users do not have a banking relationship. In contrast, the present invention involves linking a prepaid financial card account 304 to an overdraft account or line of credit 310. Again, it is noted that, according to one embodiment of the invention, accounts 304 and 310 are offered by a financial entity other than a bank.

In operation, system 300 incorporates data structures in a computer-readable medium (not shown) for maintaining an electronic record of available funds that can be accessed by a user via a prepaid financial card. The available funds are funds associated with an amount of the balance 306 accessed by the prepaid financial card, such as access method 308, through the account 304. When account holder 302 uses access method 308 to access a balance 306 associated with account 304, the transaction amount may exceed the amount available in balance 306. The transaction amount refers to the amount of the purchase or other transaction initiated by the account holder 302. If the transaction amount, when deducted from the amount of the balance 306 accessible by access method 308, would cause the amount to drop below some threshold amount, the overdraft account 310 is accessed through account 304 for the transaction. In this manner, the fact that the available amount of balance 306 is insufficient to cover the transaction can be identified, and the amount contained in balance 312 necessary to cover the transaction can be accessed from the overdraft account 310. The "threshold amount" is an amount below which the account 304 is overdrawn. The difference between the threshold amount and the transaction amount is defined as the overdraft amount. In one exemplary embodiment where the access method 308 is a prepaid debit card or stored value financial card, the overdraft account 310 facilitates the process of recovering overdrawn funds from the account holder 302. The overdraft account 310 may also provide a stream of income for the financial institution that extends the line of credit represented by the overdraft account 310.

Embodiments of the present invention include or are incorporated in computer-readable media having computer-executable instructions or data structures stored thereon. Examples of computer-readable media include RAM, ROM, EEPROM, CD-ROM, or other optical disk storage, magnetic disk storage or other magnetic storage devices, or any other medium capable of storing instructions of data structures and capable of being accessed by a general purpose or special purpose computer. Computer-readable media also encompasses combinations of the foregoing structures. Computer-executable instructions comprise, for example, instructions and data that cause a general purpose computer, special purpose computer, or special purpose processing device to execute a certain function or group of functions. The computer-executable instructions and associated data structures represent an example of program code means for executing the steps of the invention disclosed herein.

The invention further extends to computer systems adapted for use with methods for linking overdraft accounts with accounts having accessed methods such as a prepaid debit card or stored value financial card as described herein. Those skilled in the art will understand that the invention may be practiced in computing environments with many types of computer system configurations, including personal computers, multi-processor systems, network PCs, minicomputers, mainframe computers, and the like. The invention will be described herein in reference to a distributed computing environment, such as the Internet, where tasks are performed by remote processing devices that are linked through a communications network. In the distributed computing environment, computer-executable instructions and program modules for performing the features of the invention may be located in both local and remote memory storage devices.

By providing a system in which an access method, such as a prepaid debit card or stored value financial card, is associated with an overdraft account, embodiments of the present invention provide a way for account holders to complete transactions in cases where insufficient funds are maintained in a primary balance. In addition, financial institutions providing prepaid debit and stored value financial card accounts can receive overdrawn funds from the account holder through the balance associated with the overdraft account.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. In an electronic financial system including a computing device including a processor and a memory, a method for providing overdraft protection for a prepaid financial account, the method comprising:
    maintaining an electronic record of available funds in the memory, wherein the available funds are accessed by a user via a prepaid financial card;
    receiving a request from a merchant to perform a financial transaction associated with the prepaid financial card by which funds in a transaction amount associated with a completed transaction with the user are to be transferred to the merchant using the computing device, wherein the transaction amount was below a predetermined amount so that the merchant did not require verification of funds prior to completing the transaction with the user and wherein the transaction amount causes the available funds to fall below a threshold amount;
    in response to the request to perform the financial transaction, the processor authorizing said funds to be transferred to the merchant, such that the prepaid financial card has been overdrawn by an overdraft amount that is the difference between the transaction amount and the threshold amount; and
    using an overdraft account associated with the user and the electronic record of available funds in the memory to cover at least the overdraft amount, wherein a line of credit of the overdraft account is at least as great as the predetermined amount that allows the merchant to complete the transaction with the user without verifying the availability of funds in the electronic record so that sufficient funds are available in the overdraft account to cover the overdraft amount.

2. The method as recited in claim 1, wherein the threshold amount is zero.

3. The method as recited in claim 1, wherein the prepaid financial card is one of: a debit card; a credit card; and a stored value financial card.

4. The method as recited in claim 1, wherein the available funds are associated with a balance.

5. The method as recited in claim 4, wherein the balance is accessed through one or more account controls.

6. The method as recited in claim 1, wherein the overdraft account is associated with an overdraft balance.

7. The method as recited in claim 6, wherein the overdraft is associated with one or more account controls.

8. The method as recited in claim 1, wherein the overdraft account is automatically accessed when the amount of the balance associated with one of the account controls is below the threshold amount.

9. A method for providing overdraft protection for a prepaid financial account in an electronic financial system including a computing device including a memory and a processor, the method comprising:
    establishing an account holder data structure in the memory, the account holder data structure being associated with a user who can access an account of the financial system via an access method;
    establishing an account control in the memory, wherein the account control:
        is associated with the account holder data structure and has an account definition that defines capabilities and functionality of an associated account that can be accessed by a user; and
        is accessed by a prepaid financial card via the access method;
    storing a balance that is associated with the account control in the memory; and
    establishing an overdraft account control that is associated with the account control and with an overdraft balance, wherein an amount of the overdraft balance can be accessed when a transaction is completed between the merchant and user without the merchant verifying the availability of funds in the balance associated with the account control and wherein the computing device transferring the transaction amount to the merchant and causes the balance associated with the account control to fall below a threshold amount;
    wherein the overdraft balance is at least as great as a predetermined amount that allows the merchant to complete the transaction with the user without verifying the availability of funds in the balance associated with the account control so that sufficient funds are available in the overdraft account to cover the overdraft amount.

10. The method as recited in claim 9, wherein the overdraft account is automatically accessed when the balance associated with the one of the account controls is below a threshold amount without requiring the user to request access to the balance.

11. The method as recited in claim 9, wherein the balance is also associated with a second account control.

12. The method as recited in claim 9, wherein the prepaid financial card is one of: a debit card; a credit card; and a stored value financial card.

13. The method as recited in claim 9, wherein the threshold amount is zero.

14. A financial system for providing overdraft protection for a prepaid financial account using a computing device including a processor and a memory, the system comprising:
    an account holder stored in the memory being associated with a user who can access an account of the financial system by communicating with the processor connected to the memory;
    an account control stored in the memory, wherein the account control:
        is associated with the account holder and has an account definition that defines capabilities and functionality of an associated account that can be accessed by a user; and is accessed by a prepaid financial card that the user gives to a merchant in order to initiate a transaction in a transaction amount;

a balance that is associated with the account control in the memory; and an overdraft account control that is associated with the account control and with an overdraft account balance in the memory, wherein an amount of the overdraft balance can be accessed when the transaction is completed between the merchant and the user without the merchant verifying the availability of funds in the balance associated with the account control and wherein the computing device transferring the transaction amount to the merchant causes a balance associated with the account control to fall below a threshold amount;

wherein the amount of the overdraft balance is at least as great as a predetermined amount that allows the merchant to complete the transaction with the user without verifying the availability of funds in the balance associated with the account control so that sufficient funds are available in the overdraft account to cover the overdraft amount.

15. The system as recited in claim 14, wherein the threshold amount is zero.

16. The system as recited in claim 14, wherein the prepaid financial card is one of: a debit card; a credit card; and a stored value financial card.

17. The system as recited in claim 14, wherein the balance and the overdraft account control are associated with a plurality of account holders.

18. The system as recited in claim 14, wherein the prepaid financial card accesses the overdraft balance through the overdraft account control.

19. The system as recited in claim 14, wherein the overdraft balance is automatically accessed when the balance associated with the account control is below the threshold amount.

20. The method as recited in claim 1, wherein the financial account is not associated with a bank.

* * * * *